United States Patent
Marcy et al.

[15] 3,692,413
[45] Sept. 19, 1972

[54] SYSTEMS FOR ACCURATELY POSITIONING AN OBJECT IN A PLANE BY MEANS OF TRANSLATORY MOVEMENTS

[72] Inventors: Raymond Marcy; Jean Bouygues; Michel Lacombat, all of Paris, France

[73] Assignee: Thomson-CSF

[22] Filed: Nov. 18, 1970

[21] Appl. No.: 90,610

[30] Foreign Application Priority Data

Nov. 25, 1969 France.....................6940590

[52] U.S. Cl. .................356/106, 356/110, 356/172, 90/58 R, 83/648, 318/577
[51] Int. Cl..........................C01b 11/26, B26d 7/16
[58] Field of Search .....356/106, 110, 172; 331/94.5; 90/58 R; 83/648; 318/577

[56] References Cited

UNITED STATES PATENTS

| | | |
|---|---|---|
| 2,853,917 | 9/1958 | Koulikovitch.............356/106 |
| 3,190,173 | 6/1965 | Pettavel.................356/106 X |
| 3,207,904 | 9/1965 | Heinz....................356/172 X |
| 3,218,915 | 11/1965 | Ramsey ................356/112 X |
| 3,224,323 | 12/1965 | Chitayat....................356/110 |
| 3,241,243 | 3/1966 | Speer .....................33/1 M X |
| 3,377,111 | 4/1968 | Brault.................356/106 UX |
| 3,466,514 | 9/1969 | Brunner et al.........318/577 X |
| 3,448,280 | 6/1969 | Blitchington, Jr. ....356/172 X |
| 3,588,254 | 6/1971 | Rhoades et al............356/106 |

FOREIGN PATENTS OR APPLICATIONS 357,030 10/1961 Switzerland.................350/90

OTHER PUBLICATIONS

Jarrell, R. F., et al, "Some New Advances in Grating Ruling, Replication and Testing." Applied Optics, Vol. 3, No. 11, November 1964, p. 1251–1261.
Tuttle, Machine Design, Feb. 16, 1967, pp. 227–9
Engelter et al, Solid State Technology, November, 1968, pp. 43–5.

Primary Examiner—Ronald L. Wibert
Assistant Examiner—R. J. Webster
Attorney—Cushman, Darby & Cushman

[57] ABSTRACT

The invention relates to a system for displacing an object supported on a carriage sliding above a bench, in such manner as to follow accurately a rectilinear trajectory. The lateral and rotational deviations of the object from the ideal trajectory are sensed by means of interferometer optical means which control a plurality of electromechanical transducers for cancelling out said deviations.

10 Claims, 5 Drawing Figures

PATENTED SEP 19 1972

SYSTEMS FOR ACCURATELY POSITIONING AN OBJECT IN A PLANE BY MEANS OF TRANSLATORY MOVEMENTS

The present invention relates to improvements in systems for accurately positioning an object in a plane by means of translatory movements of said object in one or several directions and in particular in two directions X and Y perpendicular to each other. The invention relates more particularly to means for automatically correcting the position of the object in order to obtain the predetermined position with a very small error, for example an error less than one tenth of a micron in each of the directions of translation.

Systems of this type are utilized, for example, in the manufacture of integrated circuits in order to displace either the masks or the substrates used for constructing the integrated circuits. Displacements of this kind, have an overall amplitude lying between 1 cm and 1 decimeter. They include generally successive translatory movements along the X and Y directions, each translation having to be effected with a high degree of precision.

Known systems of this kind, employ optical interferometry techniques in order to monitor the displacements and correct them by means of electro optical feedback loops. Error signals are obtained by comparison of the results of interferometric measurements and predetermined data. Actuating means which for example comprise piezoelectric transducer devices receive the error signals. Such systems have already been described in a copending application Ser. No. 808,619 filed on Mar. 19, 1969 in the U.S. Patent Office.

The systems described in the present patent application generally comprise a bench associated to a carriage sliding both in the X and Y direction. The position correcting system and the object which is to be positioned are supported by the carriage. The object can be mounted on a support integral with the carriage, said bench serving as a reference plane for the X and Y displacements. The position correcting system, which is the main object of the invention disclosed in this Patent Application, comprises several concentric frames all situated approximately in the same plane and mechanically attached to one another by means of piezoelectric ceramic transducers and torsion strips.

The transducers receive the error signals resulting from comparison of the measurement data delivered by the interferometer units and predetermined data corresponding to the desired displacements, the object or its support carrying mirrors which are the moving mirrors of the interferometer units.

This kind of positioning system, although it enables a high degree of precision to be achieved in the correction of translational errors along two perpendicular directions, and in particular those deviation occuring in these directions (which deviations are due chiefly to faults in the translating elements and are often referred to as "yaw movements"), is nevertheless quite a delicate mechanical system and as such can lead to inaccuracy in the positioning system.

According to the present invention there is provided a system for accurately positioning an object supported by a carriage sliding above a bench, said system comprising for each translation direction of said carriage above said bench: one position correcting unit introducing displacements of said object with respect to said carriage, interferometer distance sensing means positioned on said bench for delivering at least two error signals representative of the deviations of said object from a rectilinear trajectory, and feedback means feeding said signals to said correcting unit for substantially cancelling out said deviations; said correcting unit comprising: a lower plate carrying two projecting posts, an upper plate having two points of support respectively facing said posts, elastic members for linking said plates to each other, an elastic hollow cylinder perpendicular to said plates, means integral with said plates for clamping said cylinder, and electromechanical transducer elements respectively inserted between said posts and said points of support for loading the lateral wall of said cylinder.

For a better understanding of the invention and to show how the same may be carried into effect, reference will be made to the drawings accompanying the ensuing description and in which:

FIG. 1 shows a system for accurately positioning an object O in one plane.

This system comprises a bench B which serves as a reference for the displacements. On this bench there are assembled two superimposed carriages for displacement in the X and Y directions, respectively $P_X$ and $P_Y$, then the correcting unit. In this example, the object O is mounted on the correcting unit C through the medium of a support S carrying two mirrors $M_X$ and $M_Y$ perpendicular to each other. Mirrors $M_X$ and $M_Y$ are the moving mirrors of the interferometers of the device used to measure the displacement. These interferometers $I_1$, $I_2$, $I_3$, $I_4$, fixed to the bench B, will for example be Michelson interferometers operating with coherent light. Advantageously, two of them will be provided for each direction of translation in order to permit measurement of the translational and rotational deviations in relation to these two directions. The two first one $I_1$, $I_2$ enable measurement of the deviations or errors $\xi_Y$ in respect of the direction of translation X to be effected with the help of the mirror $M_y$, the two others $I_3$, $I_4$ enable measurement of the deviations or errors $\xi_X$ with respect to the direction of translation Y, to be effected with the help of the mirror $M_x$. The results of the measurements made by these interferometers are utilized, as will described hereinafter, on the one hand to correct the aforesaid deviations as the translational movement progresses, and on the other hand to accurately measure the actual displacements effected and if necessary correct them.

The correcting unit C is constituted by two functionally independent correcting elements, one of which corrects the deviations $\xi_x$ in relation to a predetermined direction Y, and the other the deviations $\xi_y$ in relation to a direction X perpendicular thereto.

Figure 2:
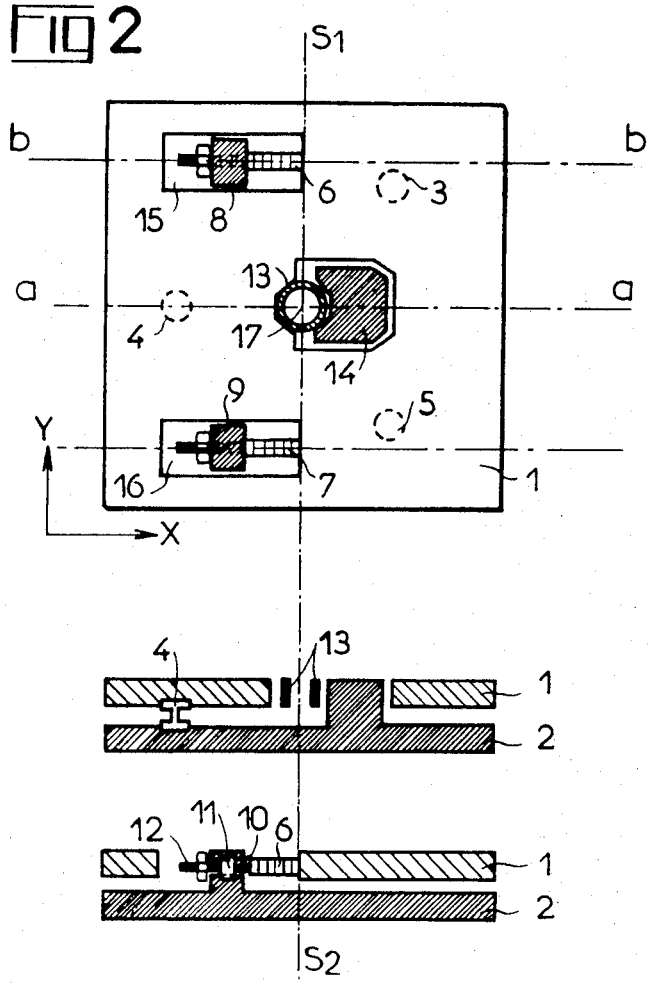
FIG. 2 illustrates a set of three schematic views showing a correcting element for one direction X, with two plates; the first view is a plan view whilst the two others are sections on the axes $aa$ and $bb$ of the first.

FIG. 2 schemcatically illustrates three views of one embodiment of these two correcting elements, for example the one used to correct the $\xi_x$ deviations in relation to the Y direction.

The first view, is a view in plan illustrating this correcting element for the direction X. There is shown the whole of the upper plate 1 which is movable in relation to the lower plate 2, the latter hereinafter being referred to as the fixed plate. In the two sectional views along the lines aa and bb, the moving plate 1 is picked out by more widely spaced cross hatching than that used for the fixed plate 2. In the first view, a plan, the visible parts of the plate 2 are shown by close cross hatching.

These two plates are maintained parallel to one another and spaced slightly apart, by means of three elastic members in the form of small elastic pillars 3, 4, 5 fixed to the two plates as a section aa shows and arranged in a triangular formation around the center 17 of the plates in order to distribute the weight more or less equally between the three. These elastic members are of a sufficiently low stiffness to enable small relative displacements between the two plates to take place, i.e., translation and rotation of plate 1 with respect to plate 2. Thanks to this arrangement, the relative movements between the two plates are effected by virtue of the elastic deformation of the members and this has the major advantage on known devices of excluding virtually all the discontinuities which ball or roller mountings can introduce into these very low-amplitude movements.

Figure 3:
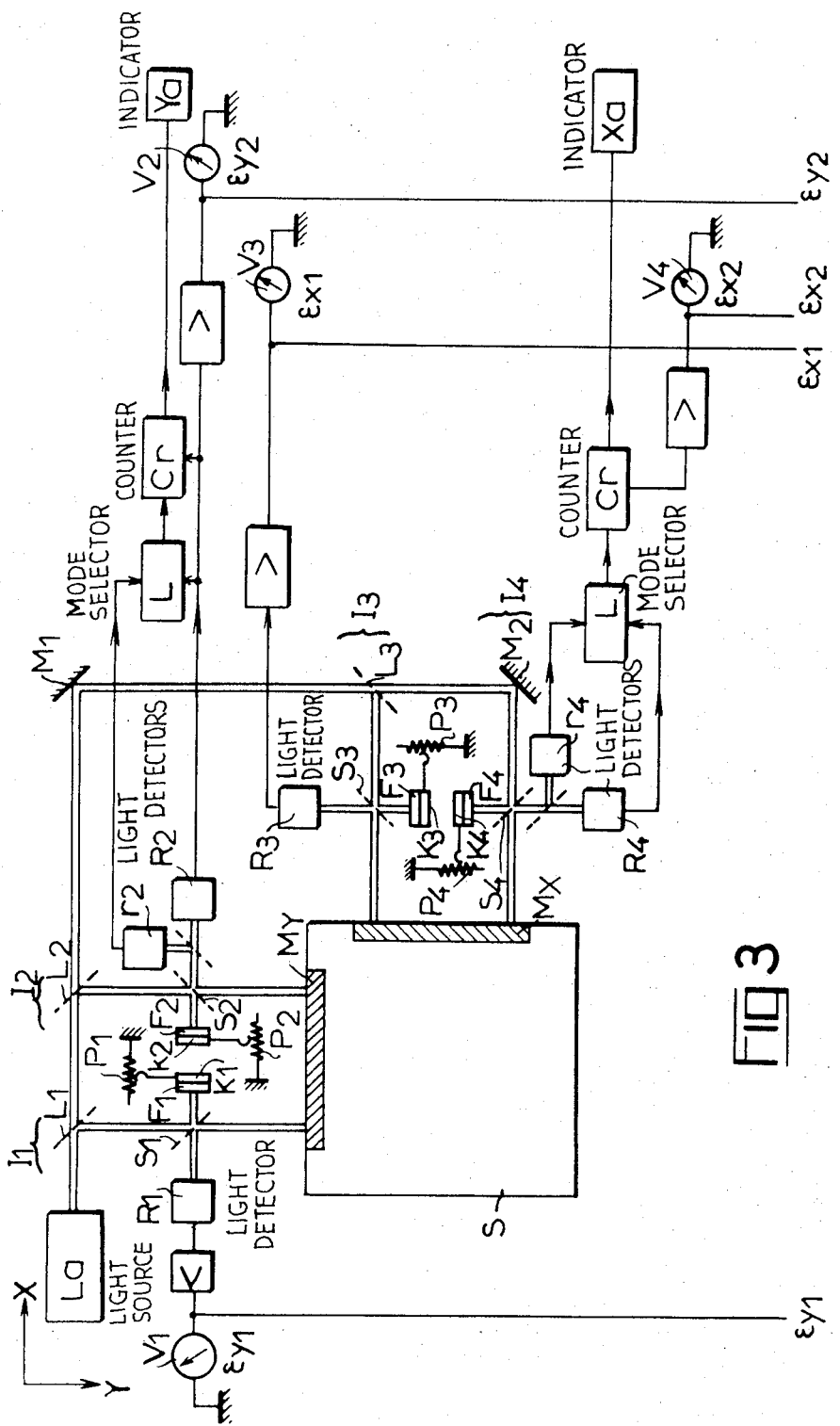
FIG. 3 is a block diagram of the interferometer measuring units and the associated circuits for monitoring two mutually perpendicular translations.

The displacements of the moving plate 1 in relation to the fixed plate 2 are controlled by two stacks of piezoelectric transducers 6 and 7 which receive the error signals supplied by the distance sensing units schematically shown in FIG. 3. Each of these transducer stacks is inserted between the points of support of an opening 15, 16 formed in the moving plate, for example, and a lateral face of post 8, 9 of the other plate, the fixed plate in this example, which post projects into said opening. The section along the line bb provides a schematic illustration of this arrangement; the mechanical link between the set of transducers 6 or 7 and the plate 2, is provided by a metal ball 10 and a nut 11 fixed to the plate 2. A screw 12 makes it possible, prior to any use of the system, to adjust the stresses applied to the ceramic components in the absence of any error signal, in order particularly to compensate for the disuniformities of the transducer stacks constituting the two groups 6 and 7, and render the operation of the system symmetrical.

The guiding of the moving plate in relation to the fixed one and its return after the various microscopic displacements which it undergoes in translational and/or rotational modes, are effected by means of an elastic element, such as a hollow metal cylinder 13 vertically located approximately at the center of the plates and supported, for example at four points on its circumference, by clamping means comprising: two V-shaped surfaces, located opposite one another, one being arranged on the lateral part of an opening formed on the moving plate and the other on the lateral part of a stand 14 fixed to the fixed plate 2.

The relative positions of the ring 13 and the two sets of ceramic components 6 and 7, are extremely important; it is necessary, for the correcting system to operate in an optimum manner, that the center of the ring 13, be aligned with the points of abutment of the two sets of transducers 6 and 7, against the plate 1 (this alignment is shown by the axis $S_1$, $S_2$ in FIG. 2), and that the two sets of transducers 6 and 7 shall be equidistant from said ring, i.e., disposed symmetrically in relation to the axis aa of the plan view.

If this arrangement is respected, the loaded hollow cylinder 13 can properly fulfill its dual function which consists on the one hand of elastically returning the moving plate 1 relatively to the fixed plate 2, in the translatory mode, and on the other hand of guiding its rotation by localizing the instantaneous center of rotation, the point 17, a translational motion being produced by deformation of similar direction and amplitude in the two sets of transducers 6 and 7, whilst rotation about 17 is produced by deformations of similar amplitude and opposite directions.

The profile of the longitudinal section of the cylindrical wall, the location of its points of support on the two V-shaped surfaces, and the diameter/height ratio of the cylinder, are contrived so that on the one hand the two types of load to which the cylinder is subjected during translatory motions are distributed in the best possible way (these loads causing (a) a deformation similar to that of an annular-section beam resting on two supports and loaded in the longitudinal plane; and (b) a deformation similar to that of a ring fixed between four tangent planes forming two opposed Vs, and distorting in the plane perpendicular to its own axis), and on the other hand to ensure that the surface of the cylinder has sufficient curvature to ensure rotational guidance despite the distortions which said surface undergoes as the consequence of the loads stemming from the translational motions.

This kind of two-plate correcting system makes it possible, for example, to achieve translatory correction $\xi_x$ of only a few microns with a degree of accuracy better than one hundredth of a micron, and rotational corrections about the point 17 in the order of 10 seconds of arc.

The adjustment of the stresses applied to the ceramic components in the absence of any error signal, is such that the cylinder 13 is slightly squashed in order to permit corrections in both senses in the X direction. Moreover, this permanent squashing of the cylinder enables the various clearances due to the assembly of the ceramic components between the two plates, to be cancelled.

Figure 1:
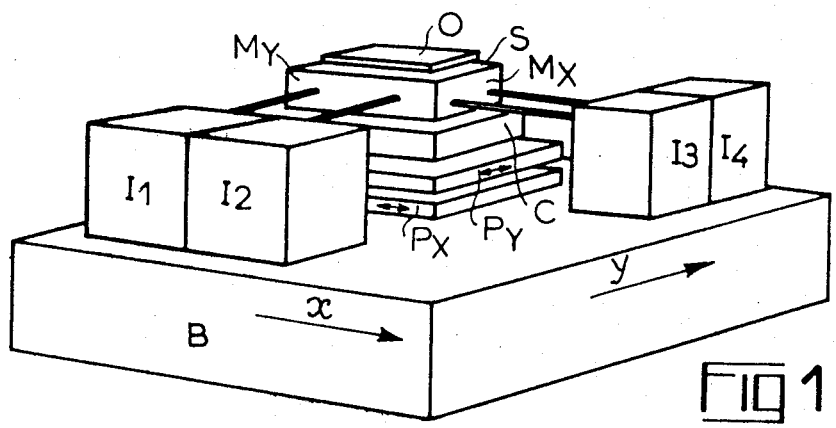
FIG. 1 illustrates a high accuracy positioning system for positioning an object in one plane.

To produce the complete correcting unit C of the system of FIG. 1, it is merely necessary to superimpose two elementary units of the kind just described, arranging them at 90° to one another in order that one correct the $\xi_x$ deviations in the direction X, and the other the $\xi_y$ deviations in the direction Y.

An X and Y correcting unit of this kind can be somewhat simplified if the fixed plate of the bottom correcting element is constituted by the plate Py immediately below in FIG. 1, and its moving plate constituted by the fixed plate of the second correcting element.

In either case, the two correcting elements which function indepently of one another since they each correct the deviations in one direction only, will advantageously be superimposed so that the centers of their hollow cylinders, these being the centers of rotation, are aligned with one another. This condition, although by no means essential, facilitates the design and operation of the correcting unit, the rotational corrections then taking place about one and the same center.

FIG. 3 schematically illustrates the interferometer measurement unit and the associated circuits which, in particular, enable the error signals to be generated which are applied to a complete correcting unit, that is to say error signals which correct the X and Y deviations during the course of the positioning of the object by translatory motions in the Y and X directions.

The four interferometers $I_1$, $I_2$, $I_3$, $I_4$ fixed to the reference bench B as shown in FIG. 1, are supplied from a laser source La whose beam is reflected and/or transmitted by three partially reflective plates $L_1$, $L_2$, $L_3$ and two mirrors $M_1$ and $M_2$. Each interferometer comprises a semi-reflective plate $S_1$, $S_2$, $S_3$, $S_4$ in the usual way, a normally fixed reference mirror $F_1$, $F_2$, $F_3$, $F_4$ whose position can be adjusted very accurately by a piezoelectric transducer controlled by a potentiometer $P_1$, $P_2$, $P_3$, $P_4$, a moving mirror which is constituted by one or other of the two mirrors $M_x$ and $M_y$ which are mounted at an angle of 90° on the object support S of FIG. 1. Mirrors $M_x$ and $M_y$ can be mounted, if desired, on the last plate of the connecting device C with which the object mounting or the object itself are secured. Each interferometer further comprises an optical receiver $R_1$, $R_2$, $R_3$, $R_4$, and, following the latter, a voltmeter $V_1$, $V_2$, $V_3$, $V_4$, which enables the displacement of the interference fringes of the corresponding interferometer, to be observed.

At the beginning of a positioning operation, the preliminary adjustments having been made (adjustment of the preloads in the ceramic components of the correcting unit, adjustment of the parallelism of the mirrors $M_x$, $M_y$ and of the direction of the displacement, namely Y and X) the object to be positioned is displaced close to its point of origin with the help of the plates $P_x$ and $P_y$; this point of origin can be defined to within better than 0.1 micron for example by controlling sections of the four groups of transducers of the two correcting elements, which sections are electrically independent of the section forming part of the feedback loop. However, in order to carry out this operation, the feedback loops are opened in order not to interfere with the foregoing adjustment.

When the point of origin has been thus defined, the potentiometers $P_1$, $P_2$, $P_3$, $P_4$ are adjusted in order to produce fine displacement of the reference mirrors $F_1$, $F_2$, $F_3$, $F_4$ and position them for example in such a manner that the voltmeter $V_1$, $V_2$, $V_3$, $V_4$ indicate a zero value characteristic of the sinusoidal signal produced by the receivers $R_1$, $R_2$, $R_3$, $R_4$ in response to the passage of the interference fringes, this zero value being situated for example on a part of such signal where the slope is positive.

It should be remembered that the displacement sensing devices being interferometers, their output voltage follows a linear variation in response to the displacement $\xi$. This results from the fact that they have an S-shaped discrimination curve centered about the zero output. The S-type discrimination curves are obtainable either directly by utilizing the sinusoidal signal aforementioned (about a zero point) or by carrying out synchronous detection of said signal about a peak, the modulation being effected in the conventional manner on the laser beam.

Starting from the adjusted initial position of the object, displacements can then be effect by translations in X and Y directions. If the translatory movements are for example in the X direction deviations $\xi_y$ have to be corrected. The $\xi_{y1}$ an $\xi_{y2}$ signals produced by the receivers $R_1$ an $R_2$ are amplified and applied, for example across switches, to the corresponding sections of the two groups of transducers of the Y correcting element.

A feedback loop is thus formed which corrects the yaw movements. Any deviation due to either translation or rotation of the object during its translation generates small displacements of the interference fringes and thus error voltages $\xi_{y1}$ and $\xi_{y2}$. The two groups of transducers of the Y correcting element are actuated for cancellation of the deviation. The process is the same for a translation in the Y direction, the error signals applied to the correcting unit then being the $\xi_{x1}$ and $\xi_{x2}$ signals respectively applied to the corresponding sections of the two groups of transducers of the X correcting element.

As already mentioned, the high-precision positioning system in accordance with the invention not only makes it possible to correct deviations during translatory movements, but also enables accurate measurement of the amplitude of said translations to be effected with an error smaller than half the wavelength of the laser radiation, for example 0.3 microns. An accuracy of better than one tenth of a micron can be achieved where static measurements are concerned.

To this purpose, it is merely necessary to supplement the measurement unit by a device which can count the interference fringes as they pass, whilst at the same time taking account of the direction of movement which this interference fringe movement relates to. Devices of this kind have been described for example U.S. Patent application Ser. No. 4238 filed on Jan. 20, 1970.

The measurement unit of the positioning system in accordance with the invention is thus supplemented by two of these fringe-counting devices, namely one such device for each direction of translation. Each of these devices comprises, associated with one of the two interferometers of the corresponding direction, $I_2$ and $I_4$ for example, a second photoelectric receiver $r_2$ an $r_4$ a logic circuit L, a count-up/count-down device $C_r$ and for example a direct display device $Y_a$, $X_a$.

In the event of a translation in the X direction for example, the two photoelectric receivers r4 and R4, by means of the interleaved signals which they produce, control the logic circuit L which, as a function of the direction of displacement along the axis, itself controls count-up or count-down operations by the counter Cr, preventing the same fringes being counted several times for example as a consequence of vibrations. The result of this measurement is read off, with an error smaller than half a wavelength, on the display device or instrument $X_a$, whilst the voltmeters $V_3$ and $V_4$ indicate the excess (a fraction of the value of the count) so that the value of the displacement in the X direction can be known with an error smaller than one tenth of a micron.

These counting devices for the measurement of displacements enable the values of predetermined displacements to be measured with the aforesaid degree of accuracy. If, during the course of displacement in the X direction for example, the value read on $X_a$ is sufficiently close to the desired value, the moving plate $P_x$ is halted and those sections of the transducers of the X correcting element which were used at the start of the positioning operation in order to obtain the point of origin with a high degree of accuracy, make it possible to effect fine adjustment of the position of the object.

In the embodiment just described, the error signals $\xi_{x1}$, $\xi_{x2}$, $\xi_{y1}$, $\xi_{y2}$ are each applied to group of transducers of the corresponding correcting element, the rotational and translational corrections being effected simultaneously and jointly by the combined action of the two group of transducers on the corresponding hollow cylinder.

Figure 4:
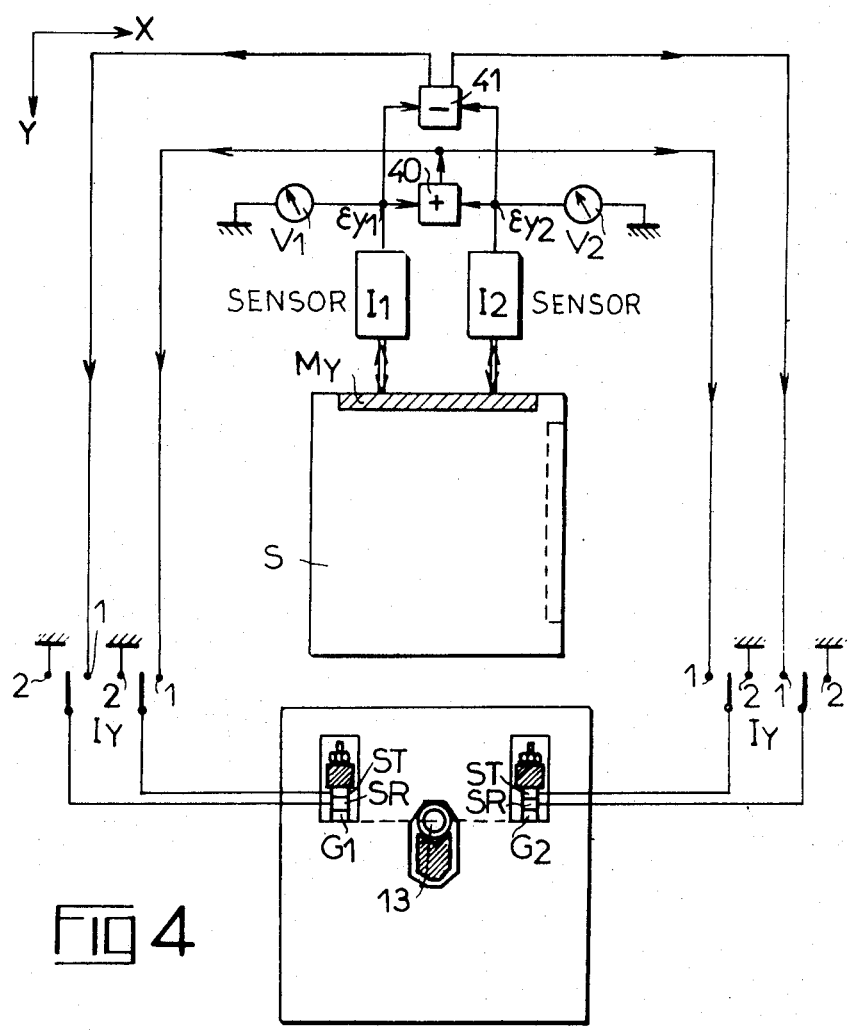
FIG. 4 is a block circuit diagram of a variant embodiment of the position correcting system, allowing the separation from one another of the rotational and translational corrections effected by each correcting element.

Another embodiment of the system in accordance with the invention, and this is in fact a preferred embodiment, is schematically illustrated in FIG. 4 and consists in functionally separating the rotational and translational corrections. For this purpose, the error voltages produced by the two interferometer sets associated with one and the same measurement mirror ($\xi_{y1}$ and $\xi_{y2}$ voltages produced by the units $I_1$ and $I_2$ associated with the mirror $M_y$ in FIG. 4, the latter illustrating the correcting unit for a single y direction corresponding with translation in the X direction), are applied on the one hand to a circuit 40 producing the sum of these voltages and on the other to a circuit 41 which produces the difference, the sum signal being characteristic of the translational deviations and the difference signal characteristic of the rotational deviations.

As FIG. 4 schematically illustrates, the sum signal produced by the circuit 40 is applied simultaneously to a section ST of each of the two groups of transducers G1, G2 of the Y correcting element, whilst the difference signal produced by the circuit 41 is supplied, with appropriate phase reversal on one side, to other sections SR of each of the two groups G1, G2. Each of these signals is applied to the corresponding transducer section by switches $I_y$ which are placed in the operative position 2 exclusively in the event of translatory movements in the X direction, this as already indicated in respect of the first embodiment of the system.

In a general manner, the two modes of correction, translation and rotation, although functionally separate, are operative simultaneously. In order that the rotational errors about a center of rotation other than the center of rotation of the correcting elements, namely the centers of the hollow cylinders (13 in FIG. 4), which could give rise to modification of the signal which characterizes the translational error, do not affect the stability of the system, the two modes of correction should be sufficiently independent of one another. For this purpose, the sum signal delivered by 40 is applied to the two groups of transducers of the corresponding correcting element, with a shorter time constant than that with which the difference signal is applied to the corresponding sections of these two groups of transducers.

Thus, the positioning system described makes it possible on the one hand to correct deviations relating to the direction of translation, with a high degree of accuracy, and on the other hand to effect a precise measurement of said translation by counting the interference fringes.

Figure 5:
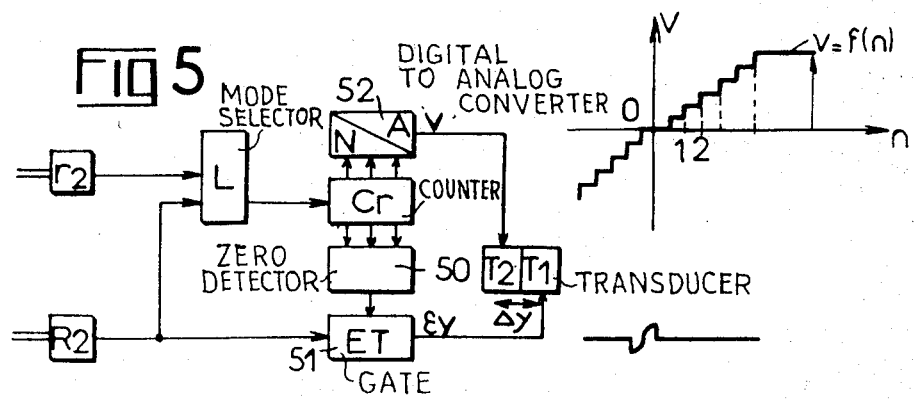
FIG. 5 is a block circuit diagram of a circuit which makes it possible to eliminate positioning errors resulting from parasitic displacements which are too fast for being corrected by the servo control.

In certain cases, in particular where the positioning system may be subject to a transitory external shock, which, for a brief instant produces a relatively substantial deviation in relation to the direction of translation occuring at the time, this with a time constant which is too short, the control system cannot correct this deviation and therefore pulls off. When the transistory shock has passed, the feedback loop may remain pulled in a cycle of the sinusoidal signal produced by the photoelectric receiver, which corresponds to an interference fringe other than that which the system tracked initially. In order to prevent this possible pulling of the feedback control in the event of a transitory shock, the system employs fringe-counting devices associated with the interferometers and represented in the FIG. 3, these devices being added in the manner shown schematically in FIG. 5. In one relatively simple embodiment, use is made exclusively of the data from one of the two interferometers associated with each direction, for example $I_2$ in the case of translatory movements along the X axis.

In a more elaborate embodiment, the two interferometers $I_1$ and $I_2$ will be used. For this purpose, it is merely necessary to complete the circuit associated with $I_1$ in the same manner as that associated with $I_2$, by adding to it a second receiver $r_1$ and a fringe-counting device. The assembly of two receivers r1, R1 is then itself completed by a circuit such as that shown in FIG. 5.

If, for example, the movement is a translatory one in the X direction, the interferometers $I_1$ and $I_2$ will measure the deviations $\xi_{y1}$ and $\xi_{y2}$. The fringe-counting systems associated with the interferometers and comprising, where the interferometer $I_2$ is concerned for example, the combination of the receivers r2 and R2, the logic circuit L and the count-up/count-down device $C_r$ will normally have nothing to count as long as the feedback control is operating. As long as this is the case, the counter $C_r$ associated with each interferometer ($I_1$ and $I_2$) will indicate zero and the zero detector element 50 connected to the counter $C_r$ will open a coincidence gate 51 which is supplied on the other hand with the error signal coming from the receiver $R_2$ (or $R_1$) and applied therefore to a section $T_1$ of the group of transducers corresponding to the relevant interferometer of the Y correcting element.

In the case of the aforesaid second variant embodiment, where rotational and translational corrections are functionally independent of one another, the coincidence gate controls the application of the sum and difference signals to the relevant sections of the groups of transducers.

In the event of a transitory shock, the counter $C_r$ associated with the one and/or the other of the two interferometers $I_1$ and $I_2$, counts up or counts off the fringes which pass by, and inhibits the coincidence gate 51 through the medium of the circuit 50. The $\xi_1$ and/or $\xi_{y2}$ fine corrections are then not effected. The data supplied by the counter $C_r$ are applied to a converter 52 of the digital-to-analog type. At the end of the transitory shock, the information $\pm n$ corresponding to the number of fringes by which the system has been displaced following the shock, is converted by the converter into a voltage V as indicated by the graph $v=f(n)$, and the resultant voltage $\pm v$ is applied to a section $T_2$ of the corresponding group of transducers of the relevant correcting element (in this case the Y correcting element) Thus, the residual deviation due to the transitory shock is approximately corrected, the counters $C_r$ return to zero and the feedback system starts to operate again.

Thus, the overall system described makes it possible to effect translational movements in one or more directions and in particular two directions at rightangles to one another, with a high degree of precision. It is particularly relevant to the manufacture of integrated circuits where it makes it possible to carry out very small X and Y displacements with a very high degree of precision, in masking machines.

The foregoing description has been given purely by way of non-limitative example and other variant embodiments can be produced without in so doing departing from the scope of the invention.

What we claim is:

1. A system for accurately positioning an object supported by carriage sliding above a bench, said system comprising for each translation direction of said carriage above said bench: one position correcting unit introducing displacements of said object with respect to said carriage, interferometer distance sensing means positioned on said bench for delivering at least two error signals representative of the deviation of said object from a rectilinear trajectory, and feedback means feeding said signals to said correcting unit for substantially cancelling out said deviations; said correcting unit including a lower plate carrying on one of its faces two posts projecting up, an upper plate having two loading points respectively facing said posts, elastic members for supporting said upper plate above said lower plate, an elastic hollow cylinder positioned within an opening of said upper plate and having an axis perpendicular to said plates; retaining means integral with said lower plate for holding said cylinder in contact with the edge of said opening, and electromechanical transducer elements located within apertures of said upper plate, and respectively inserted between said posts and said loading points for causing deformation of the lateral wall of said cylinder; said deformation allowing small movements of said upper plate substantially perpendicular to said axis.

2. A system as claimed in claim 1, wherein the axis of said cylinder crosses the middle point of a straight line joining said loading points.

3. A system as claimed in claim 2, wherein said transducer elements are stacked along two axes parallel to said upper plate and perpendicular to said straight line.

4. A system as claimed in claim 1, wherein said retaining means comprise a further post having shaped jaws integral with said lower plate; said opening being a V-shaped hollow part integral with said upper plate.

5. A system as claimed in claim 1, wherein two position correcting units are superimposed on each other; the upper plate of one of said correcting units being integral with the lower plate of said other correcting unit; the cylinders of said correcting units having the same axis.

6. A system as claimed in claim 1, wherein said distance sensing means comprise two optical interferometers; each of said interferometers including a moving mirror integral with said object, and a photoelectric transducer associated with counting means; said interferometers delivering said error signals through said counting means for controlling the transducer elements of said correcting unit.

7. A system as claimed in claim 1, wherein said feedback means comprise adding and substracting devices coupled to said interferometer distance sensing means for receiving on their inputs said error signals; said adding and substracting devices respectively supplying control signals representative of rectilinear deviations from said rectilinear trajectory and of rotational deviations about an axis perpendicular to said plates; said control signals being fed to the transducer elements of said correcting unit.

8. A system as claimed in claim 7, wherein said adding and substracting devices respectively feed said control signals to the transducer elements of said correcting unit through feedback loops having distinct time constants.

9. A system as claimed in claim 1, wherein said distance sensing means comprise two sets of optical interferometers; each of said sets including a moving mirror integral with said object; the moving mirror of one of said sets being perpendicular to the moving mirror of the other of said sets; each of said sets including fringes counting means delivering measurements of the displacements of said object along a direction perpendicular to the moving mirror associated therewith.

10. A system as claimed in claim 6, wherein said feedback means comprise: gating means having an input for receiving said error signals, a control input and an output; counting means having an input for receiving said error signals and an output; a digital to analog converter having an input coupled to said transducer elements ; and a zero detector having an input coupled to the output of said counting means and an output coupled to the control input of said gating means; said transducer elements being coupled to the output of said gating means.

* * * * *